Feb. 16, 1932.  D. S. BARROWS  1,845,220
DRAFT RIGGING
Filed April 5, 1927  2 Sheets-Sheet 1
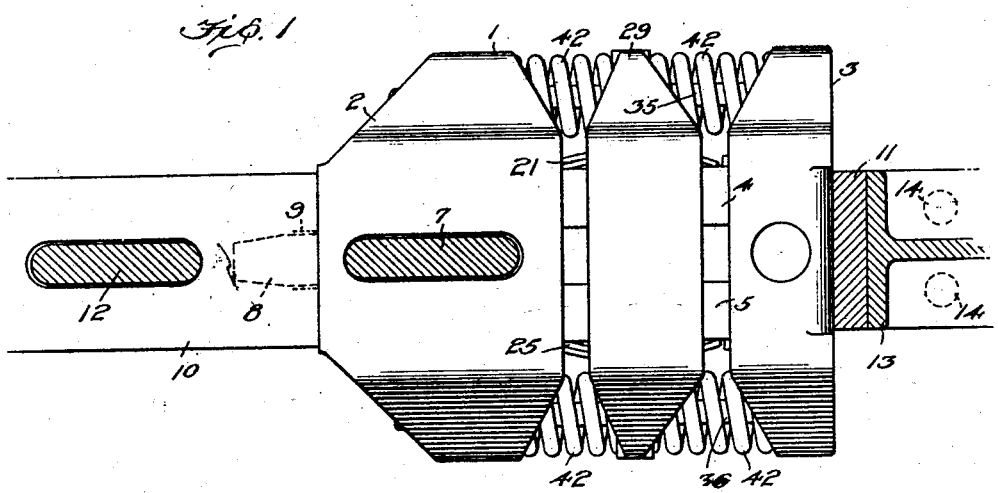
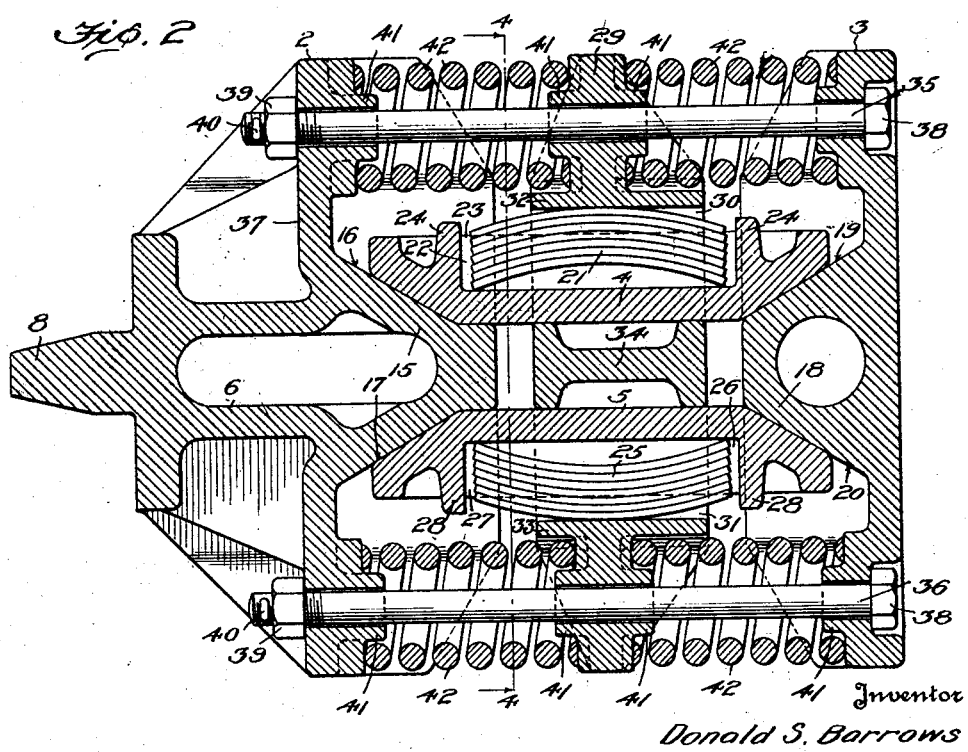
Inventor
Donald S. Barrows
By 
Attorney Feb. 16, 1932. D. S. BARROWS 1,845,220
DRAFT RIGGING
Filed April 5, 1927 2 Sheets-Sheet 2
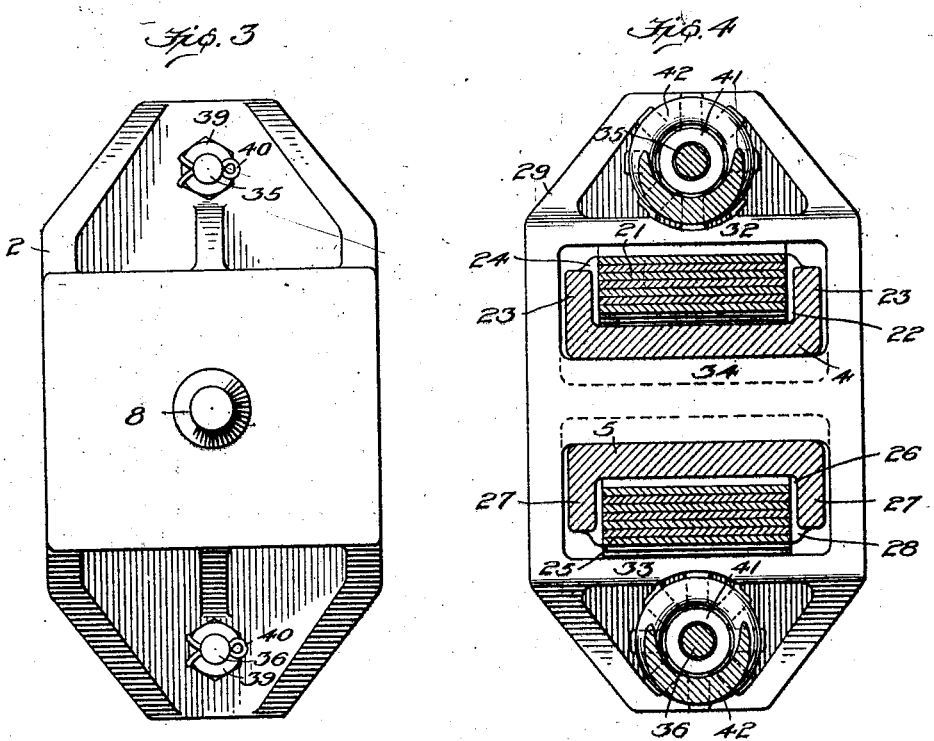
Inventor
Donald S Barrows
Attorney Patented Feb. 16, 1932

1,845,220

UNITED STATES PATENT OFFICE

DONALD S. BARROWS, OF ROCHESTER, NEW YORK, ASSIGNOR TO THE SYMINGTON COMPANY, OF NEW YORK, N. Y., A CORPORATION OF MARYLAND

DRAFT RIGGING

Application filed April 5, 1927. Serial No. 181,176.

This invention relates to draft rigging and especially to cushioning mechanism therefor particularly adapted for use on railway cars.

The principal object of my invention, generally considered, is the provision of draft gears or cushioning mechanism especially adapted for railway service and formed with a member slotted for the reception of a draft key, whereby the necessity for a separate front follower, when using Farlow two-key attachments, is obviated.

An object of my invention is the provision of a draft gear involving both spring and friction elements, said friction elements engaging wedge-shaped portions extending inwardly from end elements thereof and resiliently pressed thereagainst by leaf springs or other resilient means positioned between the same and an intermediate follower.

Another object of my invention is the provision of a cushioning mechanism involving end members formed with inwardly extending frictional surfaces engaged by friction shoes resiliently pressed thereagainst, one of said elements being slotted for the reception of an associated draft key, thereby adapting it to serve as a front follower.

A further object of my invention is the provision of a cushioning mechanism, adapted for use with railway draft rigging, involving outer friction elements formed with friction wedges extending toward each other, friction shoes formed with correspondingly inclined friction surfaces normally engaging the friction surfaces on the wedges and embraced by an intermediate follower, resilient means positioned between outer portions of said follower and pressing said shoes toward each other and into engagement with the friction wedges, said follower being alined with respect to the outer friction elements by retaining bolts passing through said elements and follower and permitting relative motion therebetween.

A still further object of my invention is the provision of cushioning mechanism, adapted for use with railway draft rigging, involving a combination front follower and friction element slotted for the reception of a draft key and formed with a rearwardly extending wedge-shaped portion providing friction surfaces, a rear element adapted to serve as a rear follower and formed with a forwardly extending wedge portion providing inclined friction surfaces, an intermediate follower positioned between the other followers and friction shoes extending through said intermediate follower with correspondingly inclined friction surfaces engaging the friction surfaces on the front and rear followers and spring-pressed into engagement therewith by spring plates exerting pressure between said shoes and oppositely disposed surfaces on the intermediate follower, said front and rear followers being assembled with each other and the intermediate follower by retaining bolts extending therethrough with springs mounted about each bolt on both sides of said intermediate follower between the end followers of the mechanism for effecting release of the gear.

Other objects and advantages of the invention relating to the particular arrangement and construction of the various parts will become apparent as the description proceeds.

Referring to the drawings illustrating my invention, the scope whereof is defined by the appended claims:

Figure 1 is a side elevation of an embodiment of my cushioning mechanism and an associated coupler, an associated backstop and draft keys being shown in vertical longitudinal section.

Figure 2 is a vertical central longitudinal sectional view of the cushioning mechanism illustrated in Figure 1.

Figure 3 is a front elevational view of the mechanism shown in Figure 2.

Figure 4 is a transverse sectional view on the line 4—4 of Figure 2 looking in the direction of the arrows.

Referring to the drawings in detail, like parts being designated by like reference characters, there is shown a cushioning mechanism 1 especially adapted for use as a friction draft gear for railway cars and designed so that it will fit a draft gear pocket of usual size. In the embodiment illustrated, it is shown assembled with Farlow attachments although it is obvious that I do not wish to be limited to such use. In the present embodiment, the gear involves a front combination follower and friction element 2, a rear combination follower and friction element 3, and friction shoes or intermediate friction elements 4 and 5 positioned therebetween.

The front friction element 2 is formed sufficiently long so as to serve as a front follower with Farlow attachments and, for that purpose, is provided with a slot 6 adapted to receive a usual form of rear draft key 7. The front portion of the member 2 is preferably provided with a lug 8 adapted to engage in a corresponding pocket 9 in a usual form of associated coupler 10. Said coupler 10 is normally supported and connected to an associated yoke 11 by means of a front draft key 12. The rear end of said yoke normally abuts the backstop 13, the sides of which are adapted for connection with associated sills (not shown) as by means of rivets 14.

The front friction element 2 is formed with a rearwardly or inwardly projecting wedge-shaped extension 15 providing an upper inclined friction surface 16 and a lower inclined friction surface 17. Likewise, the rear friction element is formed with an inwardly or forwardly extending projection 18 provided with an upper friction surface 19 and a lower friction surface 20. The intermediate or upper friction element or shoe 4 is provided with correspondingly inclined friction surfaces normally engaging the friction surfaces 16 and 19 and pressed thereagainst by resilient means 21 which, in the present embodiment, involve longitudinally curved leaf springs disposed with their concave sides downwardly or toward the center of the gear, said springs being received in a pocket 22 formed by longitudinal walls 23 and transverse walls 24 of said shoe. The intermediate or lower friction shoe 5 is likewise formed with correspondingly inclined friction surfaces engaging the friction surfaces 17 and 20 on the friction elements 2 and 3 and spring-pressed thereagainst by curved leaf springs 25 received in a pocket 26 formed by longitudinal walls 27 and transverse walls 28 depending from the main web or base of the shoe 5. These leaf springs or plates are preferably longitudinally curved to correspond with the leaf springs 21, that is, they are disposed with their concave sides upwardly or inwardly.

In order to provide for stressing the springs 21 and 25 to resiliently urge the shoes 4 and 5 against the friction surfaces of the outer friction elements, an intermediate follower 29 is provided, said follower embracing the shoes 4 and 5 and springs 21 and 25 or provided with longtudinal apertures 30 and 31 in which said shoes are appropriately received. The wall or web portion 32, opposite the pocket 22, normally presses against the springs 21 and, through them, urges the shoe 4 into frictional engagement with the outer elements 2 and 3. In a similar manner, the wall or web 33 of the intermediate follower 29 normally engages the springs 25 and, through them, presses the shoe 5 into frictional engagement with the friction surfaces of the elements 2 and 3. That portion 34 of the follower 29, between the shoes 4 and 5, serves to limit inward movement of said shoes as well as compressive movement of the gear or relative inward movement between the outer members 2 and 3 thereof, the end faces of the portion 34 being adapted for engagement by the adjacent ends of the tapered portions of the outer friction elements upon full closure of the gear. Compressive movement of the gear may also be limited and provision made for retaining the followers in proper relation with respect to each other by continuing the engaging surfaces of the central portion 34 of the intermediate follower 29 and the corresponding ends of the wedge-shaped portions 15 and 18 as edges or end surfaces of the side walls of said members, as shown most clearly in Figure 1, whereby, when the gear is compressed, a relatively great area of contact between all the follower members is effected and, at the same time, squaring of the members with respect to each other is secured by virtue of the length of the contacting surfaces.

For alining the members 2, 29 and 3, as well as holding the parts of the gear in assembled relation even when detached from associated draft rigging, a plurality of retaining bolts 35 and 36 are provided extending through corresponding, normally registering, apertures in said members and, in the present embodiment, one of said bolts extending through the upper portions and the other extending through the lower portions thereof. On account of the relatively great length of the front follower member 2 and the amount the front wall portion thereof projects beyond the transverse bolt-receiving wall 37, provision is made for compressing the gear without the ends of the bolts extending beyond the front face of the follower 2. Each of said bolts 35 and 36 preferably comprises a head 38 countersunk in the rear or transverse wall of the rear follower 3 and a nut 39 on the opposite end thereof, said nut being desirably retained in position by means of a cotter or the like 40.

The apertures in the members, through which the bolts 35 and 36 extend, are preferably surrounded by annular flanges or collars 41 and said collars serve as spring locating means for properly positioning release springs 42. In the present embodiment, one of such release springs is provided on each retaining bolt on each side of the intermediate follower 29 between said follower and the front and rear followers 2 and 3. In this way, the front, intermediate and rear followers are resiliently spaced with respect to each other and adequate means for effecting release of the gear are provided.

The gear may be assembled by inserting the bolts 35 and 36 through the apertures in the rear follower 3 and standing said follower on its rear face with the threaded ends of the bolts extending thereabove. The release springs 42, adjacent said rear follower, may then be placed in position, the intermediate follower positioned thereabove on the bolts 35 and 36 when the shoes 4 and 5, with their associated springs 21 and 25, may be forced in place, as will be understood. The front follower 2 is then placed in position, the nuts 39 tightened to the desired extent and the cotters 40 inserted, thereby holding the parts of the gear in proper assembled relation. It is thought that the operation of the gear will be understood without any further description, it being clear that the resilient engagement between the shoes 4 and 5 and the friction surfaces on the wedge 15 and 18 effect the frictional resistance of the gear while the springs 42 provide a relatively slight amount of spring resistance as well as effect a release of the gear.

From the foregoing disclosure, it will be apparent that I have devised a friction draft gear or cushioning mechanism particularly adapted for use with Farlow attachments. A decrease in the necessary length of the gear with the slotted front follower is effected by making the front friction element with a corresponding slot which extends into the wedge-shaped inner projection which forms the friction surfaces thereof. In this way, a very desirable gear is produced which is economical, not only of space, but of material.

Having now described my invention, I claim:

1. A cushioning mechanism comprising outer friction elements formed with transverse walls and wedge-shaped portions provided with inclined friction surfaces extending inwardly therefrom, intermediate friction elements positioned therebetween and formed with correspondingly inclined friction surfaces engaging the friction surfaces on the outer elements and outwardly opening pockets, an intermediate follower embracing and forming a stop for said intermediate friction elements, resilient means disposed in said pockets and exerting force between said follower and intermediate friction elements to press the latter into engagement with the inclined friction surfaces on the outer friction elements, and a longitudinal element extending through normally registering apertures in both of said outer elements and follower for holding the parts assembled.

2. A cushioning mechanism comprising outer friction elements formed with transverse walls and tapered portions extending inwardly therefrom and providing inclined friction surfaces, inner friction shoes positioned therebetween and formed with correspondingly inclined friction surfaces engaging the friction surfaces on the outer elements, each of said shoes being formed with base web portions and longitudinal and transverse web portions extending therefrom forming pockets opening outwardly, resilient means positioned in said pockets and pressing said shoes against the friction surfaces on the elements, and an intermediate follower encircling said shoes and resilient means and provided with abutment portions engaged by said resilient means, said follower being adapted for direct engagement by the adjacent ends of the tapered portions of the outer friction elements to limit relative motion thereof toward each other.

3. A cushioning mechanism comprising outer friction elements formed with inwardly extending wedge-shaped portions, friction shoes positioned therebetween and formed with correspondingly inclined friction surfaces engaging the friction surfaces on the wedge-shaped portions of the outer elements, said shoes being formed with longitudinal and transverse webs forming outwardly opening pockets, resilient means positioned in said pockets, an intermediate follower encircling said resilient means and friction shoes and presenting longitudinal surfaces engaged by said resilient means for stressing the same and causing pressure to be exerted between the friction shoes and outer friction elements, and resilient means disposed between said follower and outer friction elements.

4. A cushioning mechanism comprising outer friction elements formed with transverse walls and wedge-shaped portions provided with inclined friction surfaces extending inwardly therefrom, one of said outer elements being adapted to function as a front follower and so provided with a transverse slot adapted to receive a draft key, said slot extending into said wedge-shaped portion, whereby the length of the element is a minimum, intermediate friction elements positioned between said outer friction elements and formed with correspondingly inclined friction surfaces engaging the friction surfaces on the outer elements, and means for operatively holding said intermediate friction elements in engagement with the friction surfaces on the outer friction elements.

5. A cushioning mechanism comprising a front friction element formed with a rearwardly extending wedge-shaped portion, said element being adapted to function as a front follower when used with railway draft rigging and provided with a transverse slot adapted to receive a horizontal draft key, said slot extending into the wedge-shaped portion for decreasing the necessary length of the element, a rear friction element formed with a forwardly extending wedge-shaped portion, both of said wedge-shaped portions providing transversely disposed inwardly sloping friction surfaces, friction shoes positioned between said front and rear friction elements and formed with correspondingly inclined friction surfaces, one of said shoes engaging the upper inclined surfaces and the other engaging the lower inclined surfaces on the front and rear friction elements, said shoes being formed, respectively, with upwardly and downwardly opening pockets, resilient means positioned therein, and an intermediate follower surrounding said shoes and resilient means and providing surfaces against which said resilient means engage for energizing the same and causing them to press said shoes into engagement with the friction surfaces on the front and rear elements.

6. A cushioning mechanism comprising outer friction elements formed with transverse walls and wedge-shaped portions provided with inclined friction surfaces extending inwardly therefrom, intermediate friction elements positioned therebetween and formed with correspondingly inclined friction surfaces engaging the friction surfaces on the outer elements, an intermediate follower embracing said friction elements, and retaining bolts extending through apertures in said outer friction elements and follower and serving as guides for the latter and for retaining the parts of the mechanism in assembled relation.

7. A cushioning mechanism comprising outer friction elements formed with inwardly tapering portions, friction shoes positioned therebetween and formed with correspondingly inclined friction surfaces engaging the surfaces of the tapered portions of the outer elements, said shoes being formed with, respectively, upwardly and downwardly opening pockets, an intermediate follower device embracing said shoes and disposed between said outer friction elements, resilient means positioned in said pockets and maintained energized by engagement with the embracing follower, and retaining bolts connecting the outer friction elements above and below the friction shoes and passing through apertures in the intermediate follower for guiding the same.

8. A cushioning mechanism comprising outer friction elements formed with transverse walls and wedge-shaped portions extending inwardly therefrom and providing inclined friction surfaces thereon, friction shoes positioned therebetween, one above and one below the longitudinal center line thereof and formed with correspondingly inclined friction surfaces engaging the friction surfaces on the outer elements, an intermediate follower embracing said friction elements, retaining bolts extending through apertures in said outer friction elements and follower for retaining the same in assembled relation, and resilient means positioned adjacent each bolt on both sides of said follower and serving to properly space the parts and effect release of the gear.

9. A cushioning mechanism comprising outer friction elements formed with inwardly tapering portions, friction shoes positioned therebetween and provided with correspondingly inclined friction surfaces engaging the inclined surfaces of the tapering portions of the outer friction elements, said shoes being provided, respectively, with upwardly and downwardly opening pockets, an intermediate follower surrounding said shoes and disposed between the outer friction elements, resilient means engaged in said pockets and energized by contact with the follower, retaining means connecting the outer friction elements above and below the friction shoes and passing through apertures in said intermediate follower for guiding the same, and coil springs surrounding said connecting means on opposite sides of said follower for resiliently urging the outer friction elements therefrom to effect release of the gear.

10. In a draft rigging, in combination, a cushioning mechanism comprising a front friction element formed with a rearwardly extending wedge-shaped portion, said element being adapted to function as a front follower and provided with a transverse slot therethrough, a yoke embracing said cushioning mechanism and provided with slots registering with the slots in the front friction element, and a key extending through the slots in the yoke and the slot in the front friction element for connecting the parts together and to associated draft sills, the slot in said friction element extending into the wedge-shaped portion for decreasing the necessary length of the gear, a rear friction element formed with a forwardly extending wedge-shaped portion, the rear surface of which normally engages the rear portion of the surrounding yoke, both of said wedge-shaped portions providing transversely disposed inwardly sloping friction surfaces, friction shoes positioned between said front and rear friction elements and formed with correspondingly inclined friction surfaces, one of said shoes engaging the upper and the other engaging the lower inclined friction surfaces on the friction elements, resilient means engaging, respectively, on the upper and lower surfaces of said upper and lower friction shoes, and an intermediate follower surrounding said shoes and resilient means for stressing the latter and causing said shoes to be pressed into engagement with the friction surfaces on the front and rear elements.

11. A cushioning mechanism comprising outer friction elements formed with inclined friction surfaces extending inwardly therefrom, one of said outer elements being provided with a slot adapted to receive a draft key, intermediate friction elements positioned between said outer friction elements and formed with correspondingly inclined friction surfaces engaging the friction surfaces on the outer elements, and means for operatively holding said intermediate friction elements in engagement with the friction surfaces on the outer friction elements.

12. A cushioning mechanism comprising outer friction elements formed with transverse walls and wedge-shaped portions provided with inclined friction surfaces extending inwardly therefrom, intermediate friction elements positioned therebetween and formed with correspondingly inclined friction surfaces normally engaging the friction surfaces on the outer elements, a follower disposed between said outer friction elements and embracing said intermediate friction elements, resilient means disposed between said follower and intermediate friction elements to press the latter into engagement with the inclined friction surfaces on the outer friction elements, said follower being provided with lateral extensions formed with apertures and longitudinal guiding elements passing through said apertures and secured to said outer friction elements.

In testimony whereof I affix my signature.

DONALD S. BARROWS.